United States Patent [19]
Jones et al.

[11] Patent Number: 5,938,286
[45] Date of Patent: Aug. 17, 1999

[54] SEAT LOCKING MECHANISM AND SEAT INCORPORATING SAME

[75] Inventors: Neil H. L. Jones, Linby; Kenneth D. A. MacAndrew, Kenilworth, both of United Kingdom

[73] Assignees: Tricom Automotive Limited, Nottingham; Rover Grouup Limited, Warwick, both of United Kingdom

[21] Appl. No.: 08/889,821

[22] PCT Filed: Dec. 29, 1995

[86] PCT No.: PCT/GB95/03046

§ 371 Date: May 22, 1998

§ 102(e) Date: May 22, 1998

[87] PCT Pub. No.: WO96/20848

PCT Pub. Date: Jul. 11, 1996

[30] Foreign Application Priority Data

Jan. 7, 1995 [GB] United Kingdom ................ 9500292

[51] Int. Cl.⁶ .................................................. B60N 2/02
[52] U.S. Cl. ............... 297/378.12; 297/367; 297/378.14
[58] Field of Search ..................... 297/378.12, 378.14, 297/367; 296/65.03, 65.09, 65.16, 65.17

[56] References Cited

U.S. PATENT DOCUMENTS

| | | |
|---|---|---|
| 4,484,779 | 11/1984 | Suzuki . |
| 4,606,577 | 8/1986 | Hirama et al. . |
| 4,700,989 | 10/1987 | Ercilla . |
| 4,836,608 | 6/1989 | Sugiyama ........................ 297/378.12 X |
| 5,022,698 | 6/1991 | Butt et al. . |
| 5,383,699 | 1/1995 | Woziekonski et al. ........ 297/378.12 X |
| 5,390,980 | 2/1995 | Premji et al. ....................... 297/378.12 |
| 5,393,116 | 2/1995 | Bolsworth et al. ............ 297/378.12 X |
| 5,522,643 | 6/1996 | Matsuura ........................ 297/378.12 X |
| 5,577,805 | 11/1996 | Glinter et al. ..................... 297/378.12 |
| 5,626,392 | 5/1997 | Bauer et al. .................... 297/378.12 X |
| 5,690,386 | 11/1997 | Chabanne ...................... 297/378.12 X |
| 5,775,763 | 7/1998 | Glinter et al. ................. 297/378.12 X |

FOREIGN PATENT DOCUMENTS

| | | |
|---|---|---|
| 2 484 809 | 12/1981 | France . |
| 2 556 946 | 6/1985 | France . |
| 2 563 716 | 11/1985 | France . |
| 32 22 274 A1 | 2/1983 | Germany . |
| 39 12 463 A1 | 10/1990 | Germany . |
| 2 251 183 | 7/1992 | United Kingdom . |

*Primary Examiner*—Peter M. Cuomo
*Assistant Examiner*—Rodney B. White
*Attorney, Agent, or Firm*—Fish & Richardson P.C.

[57] ABSTRACT

A locking mechanism for a folding vehicle seat which ensures that the seat cannot be unfolded to a position suitable for use as a seat unless the seat is correctly engaged with latching points on the vehicle body. The mechanism provides a single actuating control which facilitates movement of, for example, the seat back rest from a folded to an upright position once the seat is correctly engaged with the latching points. The mechanism also provides an actuating control to facilitate seat removal from the latching or anchorage point when the seat is in the folded position.

15 Claims, 10 Drawing Sheets

SEAT LOCKING MECHANISM AND SEAT INCORPORATING SAME

The present invention relates to locking mechanisms for folding or removable vehicle seating, to seating incorporating the same, and in particular to means for ensuring that such seating cannot be used except when the seating is correctly engaged with suitable latching points on the vehicle.

It is commonplace to provide vehicles with additional seats which may be folded or collapsed in situ for compact storage within the vehicle, or which may be completely removed from the vehicle when not in use. Similarly, some seats may be folded in order to form part of an increased load carrying area. Many different types of latching mechanisms are available to secure the seating to various suitable anchorage points in the vehicle. Such seating will generally be referred to hereinafter as folding seats.

Recently, it has also become well known for vehicle seating to incorporate integrally mounted seat belts, ie. wherein at least some, if not all of the anchorage points of the seat belt are directly connected to the seat structure itself, and not directly to the vehicle body. With such arrangements it is desirable that any folding seat is correctly secured to the vehicle body prior to use, as failure to do so can render the seat belt completely or partially inoperative.

Therefore it is highly desirable to provide a folding seat with a safety device which prevents the seat from being used unless it is correctly installed with anchorage or latching points firmly engaged.

Various safety devices have been described in the prior art in which a back rest of a folding seat is prevented from being raised to a substantially upright position (ie. in which the seat may be used in a seating mode) unless the seat is correctly engaged with a floor staple or the like. An example of such a device is given in GB-A-2251183. Such prior art examples are generally of quite complex construction and typically require at least two parts of the mechanism to engage with a floor staple and convey this to a third part mounted on the seat back rest; the first part comprises a releasable hook for engagement with the floor staple and the second part senses the presence of the floor staple. The first and second parts are suitably interlinked with each other and to the third part in such a manner to ensure that the seat back rest cannot be returned to an upright condition unless the floor staple is sensed and engaged.

In the prior art systems, there is no provision for ensuring that once the seat back is placed in a folded condition, it remains in the folded position until released. Although this can clearly be provided by a separate latch mechanism, it would be desirable to have a single mechanism which fulfils the locking of the seat back rest in both upright and folded positions, as well as providing a latching point release mechanism.

In the prior art systems, there is no provision made for remote operation of the engagement mechanism, nor for remote sensing of the latching points.

It is an object of the present invention to provide a simplified mechanism which prevents movement of a first member (such as a seat back rest) between two positions (eg. upright and folded) unless a second member (eg. a floor staple latch) is in a predetermined position.

It is a further object of the present invention to provide the simplified mechanism with means to lock the first member in both of the two positions.

It is a further object of the present invention to provide such a mechanism as a general purpose type which may be coupled to a latching point and/or a release lever either directly or remotely.

According to one aspect, the present invention provides a seat locking mechanism comprising:

a seat back cam having a cam surface incorporating a deep detent and a shallow detent;

the seat back cam being lockable in a first position by a delatch arm when the delatch arm is engaged in the deep detent and lockable in a second position when the delatch arm is engaged in the shallow detent;

a sensing member for coupling to an anchorage engaging mechanism, the sensing member having a first position representative of when the anchorage is disengaged and a second position representative of when the anchorage is engaged;

the delatch arm preventing movement of the sensing member between its first and second positions except when the delatch arm is in the deep detent position.

According to a further aspect, the present invention provides a seat incorporating a seat locking mechanism as defined above.

The present invention will now be described in detail by way of example, and with reference to the accompanying drawings in which:

FIG. 7B corresponding to the staple latch in engaged but unlocked condition; and FIG. 7C corresponding to the staple latch in disengaged condition.

Figure 1A:
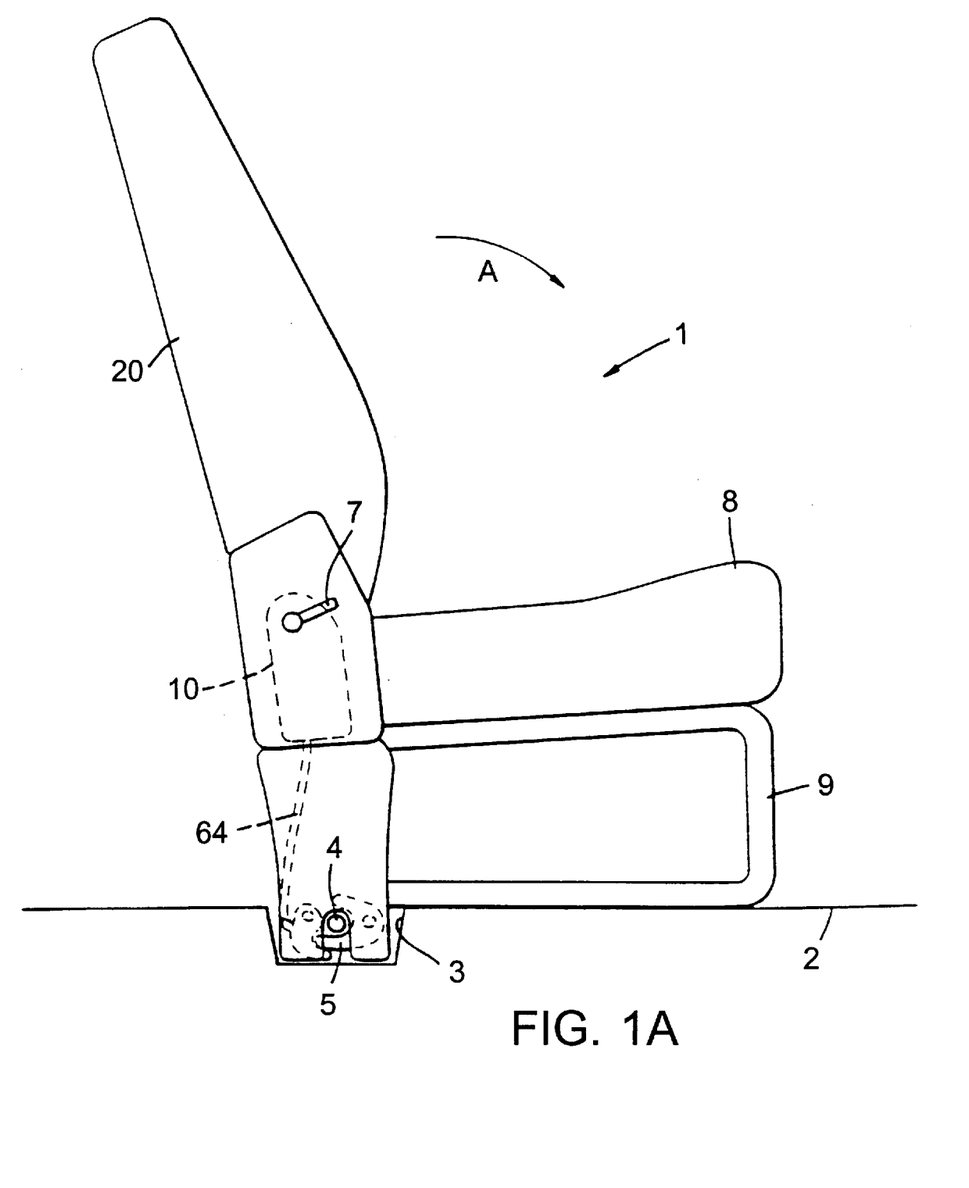
FIG. 1A shows a side view of a foldable seat incorporating one embodiment of a seat locking mechanism according to the present invention.

With reference to FIG. 1A there is shown a vehicle seat 1 in unfolded condition and engaged with the vehicle floor 2 at at least one point. A typical engaging mechanism comprises a recess 3 in the floor of the vehicle containing a staple 4 which includes a horizontal portion orthogonal to the plane of the drawing, around which a latch member 5, attached to the seat, may engage below floor level. The latch member 5 is typically actuable by a locking mechanism 10 which will be described in detail hereinafter. The seat 1 includes a seat cushion 8 which is supported by a seat frame 9 and a back rest 20 which may fold forward as depicted by arrow A in FIG. 1A, upon release by a suitable lever 7.

In a preferred embodiment, the seat is a folding seat such as that described in PCT application, GB95/02824 (Attorney file reference P14718PC) which document is hereby incorporated by reference.

Figure 1B:
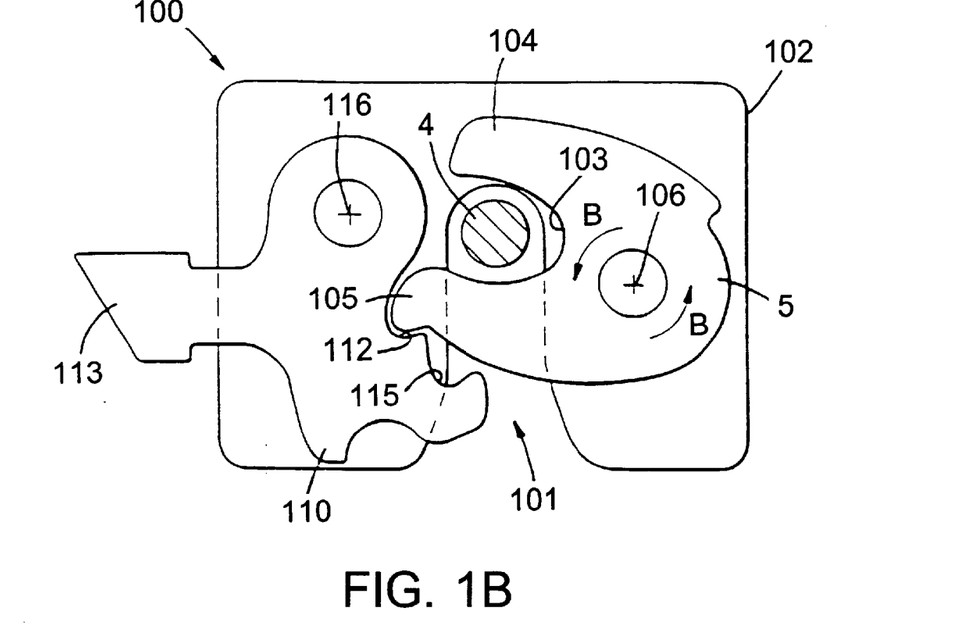
FIGS. 1B and 1C show detailed schematic views of a staple and latch mechanism in FIG. 1A suitable for use with the present invention.
Figure 1C:
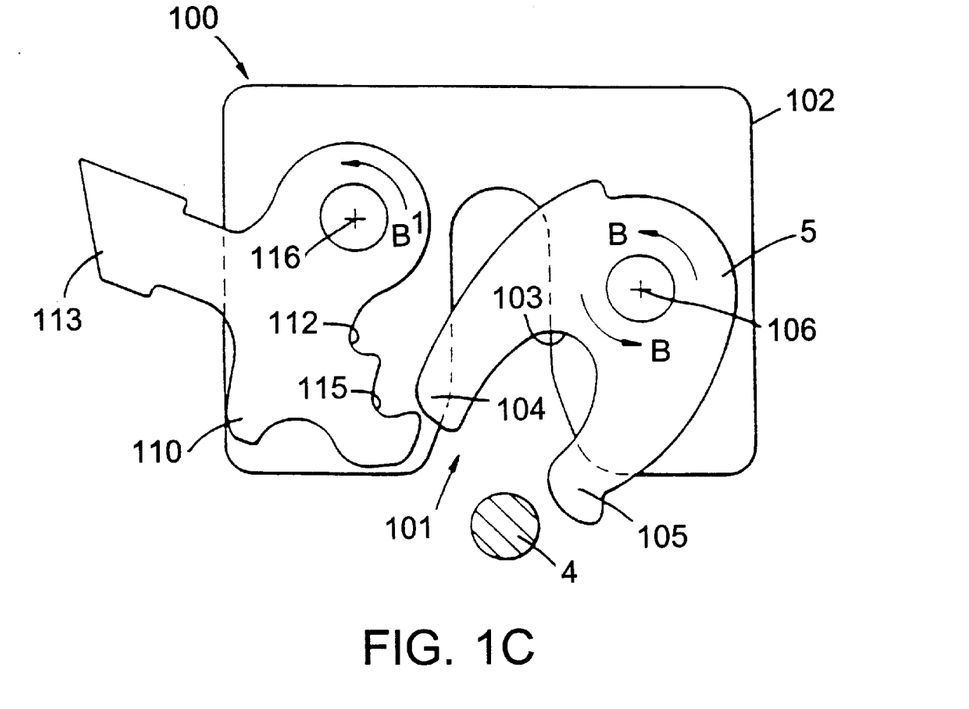

A typical engaging mechanism is now described in greater detail with reference to FIGS. 1B and 1C. The engaging mechanism 100 comprises a frame 102 which includes a slot 101 in which the staple 4 may be received. The latch member 5 is pivotally mounted on the frame 102 about point 106, and has a recess 103 which is defined between a heel 104 and a toe 105. The latch member 5 is spring biassed in the counterclockwise direction as shown by arrows B. A pawl 110 is also pivotally mounted on the frame 102 about point 116, and is biassed in an anticlockwise direction as indicated by arrow $B^1$. The pawl includes a first recess 112 adapted to receive toe 105, and a link arm 113 for coupling to a delatching lever or the like. With the staple 4 engaged, the parts are as shown in FIG. 1B. To release the staple from the latch member 5, the pawl is moved from the position shown in FIG. 1B to the position shown in FIG. 1C, using the link arm 113 operated by a suitable handle or link as will be described later. The first recess 112 thereby disengages from toe 105 allowing the latch member 5 to move, under its spring bias, to a release position as shown in FIG. 1C. The heel 104 ensures that the pawl 110 cannot return to the engaged position of FIG. 1B unless the latch member 5 is driven by the staple 4 to the latched position of FIG. 1B. The pawl may have a second recess 115 as shown which allows a semi-latched condition as is commonly found on vehicle doors.

It will be understood from the following description that embodiments of the present invention may be adapted to a wide variety of seats and engaging mechanisms. For example, although the locking mechanism to be described in detail hereinafter is described in conjunction with a seat in which the back rest folds forward, it will be understood that the invention is also applicable to seats in which the back rest folds in a different direction, or where a different part of the seat is being folded, eg. a leg or arm rest. It will further be understood that although the present invention is described with reference to the floor mounted staple-and-latch engaging mechanism described above, other types of anchorage device for securing the seat to the vehicle body are also applicable, providing that they include a two-position device (eg. pawl 110) in which a first position indicates a disengaged condition and a second position indicates an engaged condition.

A presently preferred embodiment of an engaging mechanism and method of coupling will be described later with reference to FIGS. 7 and 8.

Figure 2:
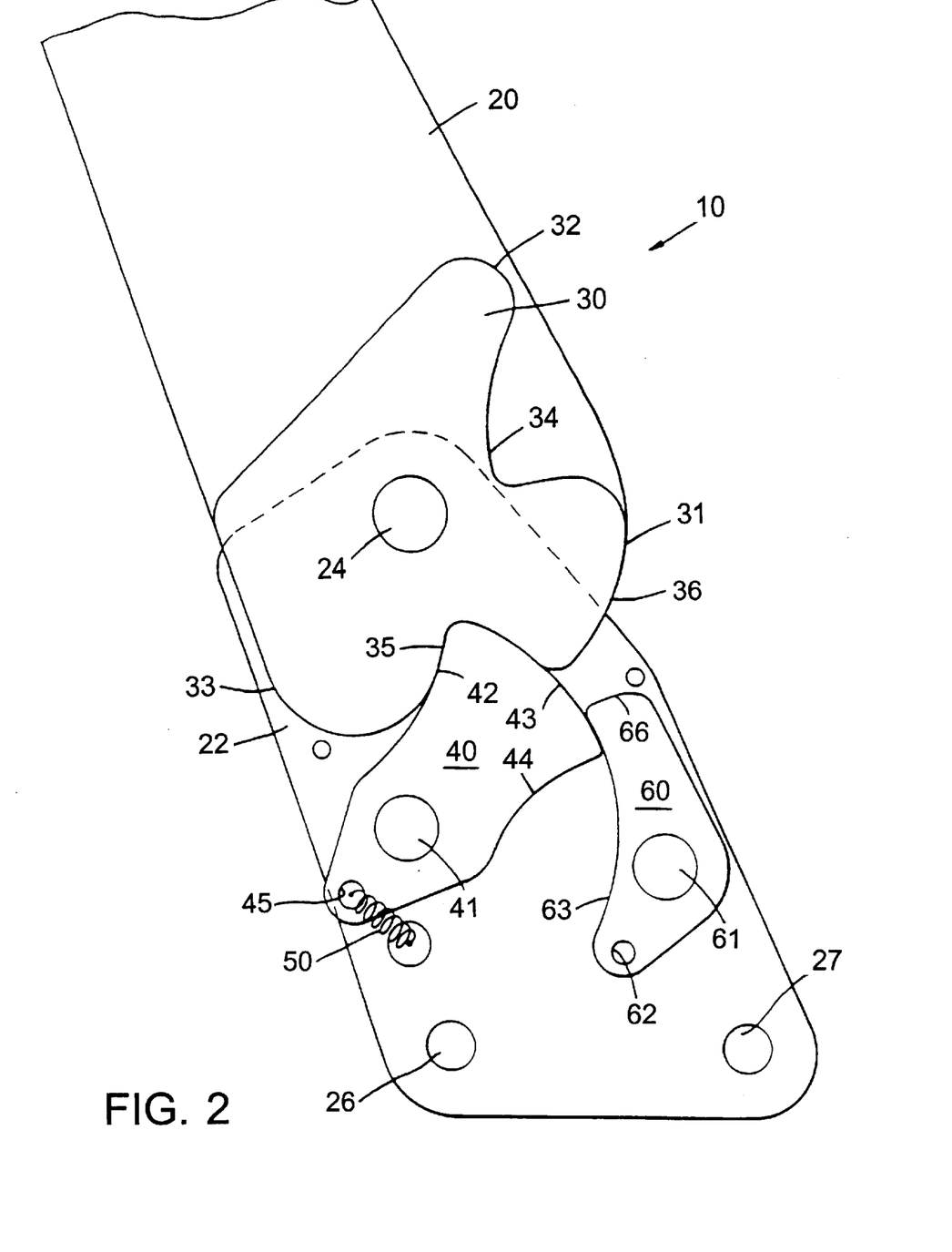
FIG. 2 shows a schematic side view of the locking mechanism of FIG. 1A, in a condition corresponding to seat back raised and locked.
Figure 5:
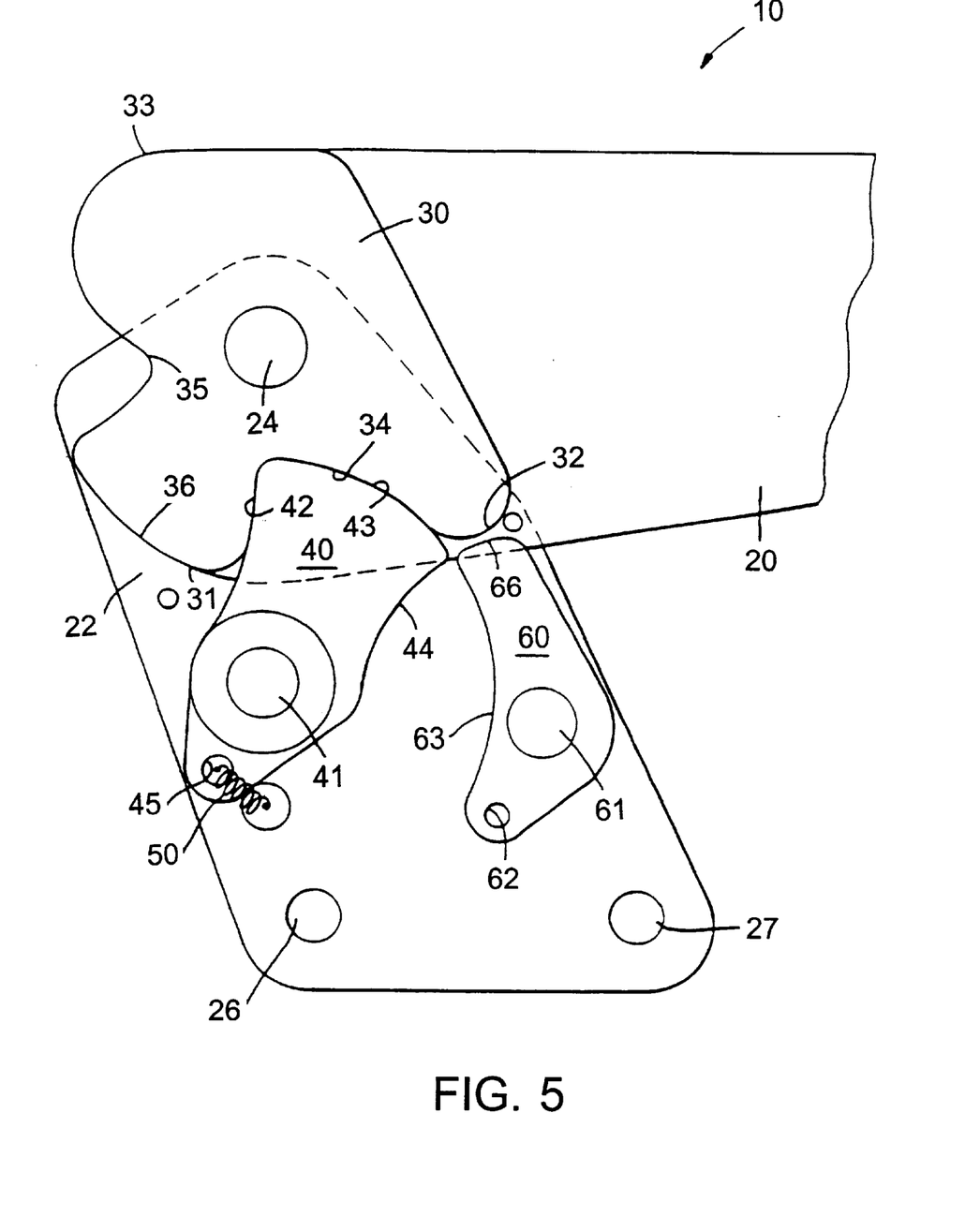
FIG. 5 shows a schematic side view of the locking mechanism of FIG. 1A, in a condition corresponding to seat back fully folded and locked with staple latch engaged.

With reference to FIG. 2 the seat back rest 20 is attached to a support plate 22 by way of a pivot 24 enabling the back rest to be pivoted from a substantially upright position as depicted in FIG. 1A to a folded position as depicted in FIG. 5, in relation to the support plate 22. Throughout the specification, the upright position of back rest 20 is referred to as the position in which the seat would normally be used in a seating mode (FIG. 1A). The folded position of the back rest 20 is referred to as the position in which the seat cannot be used in a seating mode, which may, for example, be a stowage position, or a "table top" position in which the seat back is used as a flat working surface (FIG. 5).

Rigidly affixed to the back rest is a seat back cam 30 which rotates with the back rest 20 on the pivot 24. The seat back cam 30 is preferably a flat plate in a plane orthogonal to the pivot 24 having a cam surface 31 extending between points 32 and 33. The cam surface 31 includes: a first, relatively deep, detent 34; a second, relatively shallow, detent 35; and an undetented portion 36 lying between the deep and shallow detents 34,35.

The support plate 22 is attached to, or forms part of, the seat frame 9 (FIG. 1A) and may be bolted to the seat frame at suitable points 26,27. Coupled to the support plate 22 is a delatch arm 40 which is pivoted about a pivot 41, and is biassed against the seat back cam 30 (ie. in an counterclockwise direction) by a suitable spring 50 or the like.

The delatch arm 40 includes a bearing surface 42 which cooperates with the cam surface 31 of the seat back cam 30, and two further bearing surfaces 43,44 adapted to cooperate with bearing surfaces of a sensing member which, in the embodiment of FIG. 2, comprises a sensing cam 60 to be described hereinafter. A mechanical release linkage (not shown in FIG. 2) in the form of a lever 7 (FIG. 1A), rod or knob coupled to the delatch arm is provided to enable the delatch arm 40 to be rotated about the pivot 41 in a clockwise direction. Alternatively, the delatch arm may be provided with a remote actuating lever coupled thereto via a flexible control cable which connects with a lug or aperture 45 on the delatch arm.

The sensing cam 60 is coupled to the support plate 22 by a pivot 61 and includes a connecting aperture 62 for mechanical connection to an anchorage engaging mechanism (such as that described with reference to FIGS. 1A–1C and FIGS. 7 and 8) which locks the seat to the vehicle floor. Such a mechanical connection is shown in FIG. 1A as a flexible control cable 64 which connects with the link arm 113 of pawl 110. Flexible control cable 64 may alternatively comprise a rigid linking bar, crank, lever or electromechanical link.

In the embodiment illustrated, the sensing member is in the form of the sensing cam 60 which is preferably a flat plate substantially parallel to the support plate and is rotatable in relation thereto. Two bearing surfaces 63,66 are formed by a portion of the periphery of the sensing cam, which bearing surfaces are adapted to cooperate with the delatch arm 40. However, in an alternative embodiment (not shown), a sensing member comprises an arm, pivoted on the opposite face of the support plate 22 to the seat back cam 30 and the delatch arm 40, and a peg which protrudes through an aperture (eg. an arcuate slot) in the support plate to engage the seat back cam and the delatch arm in the manner described above.

It will be understood from the position of the various elements of the locking mechanism in FIG. 2 that the seat back rest 20 is locked against movement in at least one direction (clockwise, as shown) into its upright position by the action of the bearing surface 43 of the delatch arm 40 being biassed into the shallow detent 35 by the spring 50. Depending upon the profile of the shallow detent 35 and the bearing surface 42, the delatch arm 40 may also provide full locking of the seat back cam 30 in both the clockwise and counterclockwise direction, or the locking in the counterclockwise direction could be provided by a stop member on the seat frame, for example.

The sensing cam 60 is held in its most extreme clockwise position by the bearing surface 43 of the delatch arm 40. This position of the sensing cam 60 corresponds to a locked or engaged condition of the anchorage engaging mechanism (eg. with the pawl position as shown in FIG. 1B).

Figure 3:
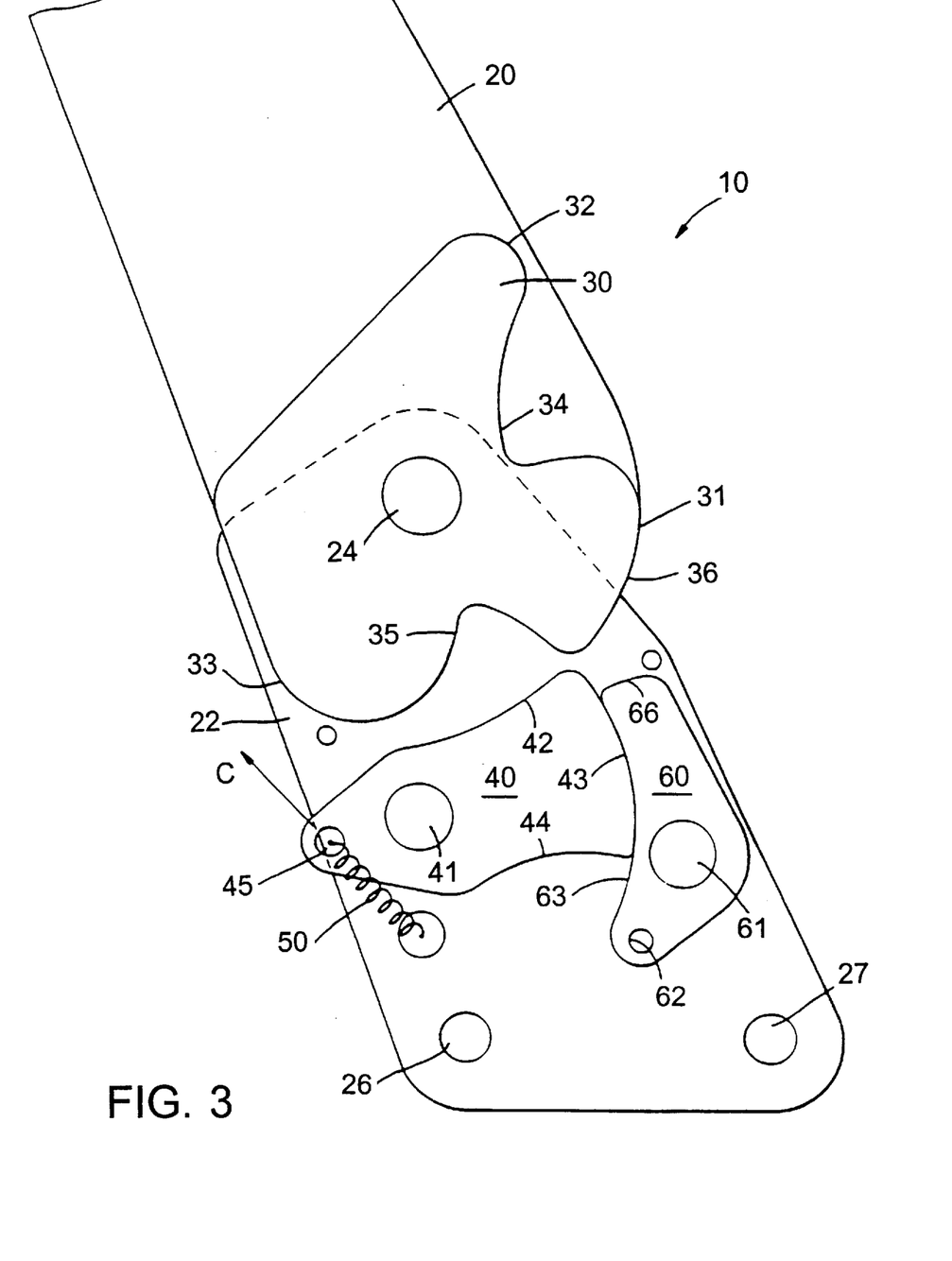
FIG. 3 shows a schematic side view of the locking mechanism of FIG. 1A, in a condition corresponding to seat back raised and unlocked.

To release the seat back from its upright position, it is necessary to overcome the spring 50 bias on the delatch arm 40 using, for example, the release lever 7. The release lever 7 operates on the delatch arm in the direction of arrow C (FIG. 3). The delatch arm 40 thus rotates in a clockwise direction until the bearing surface 43 is clear of back rest cam 30, as shown in FIG. 3.

Figure 4:
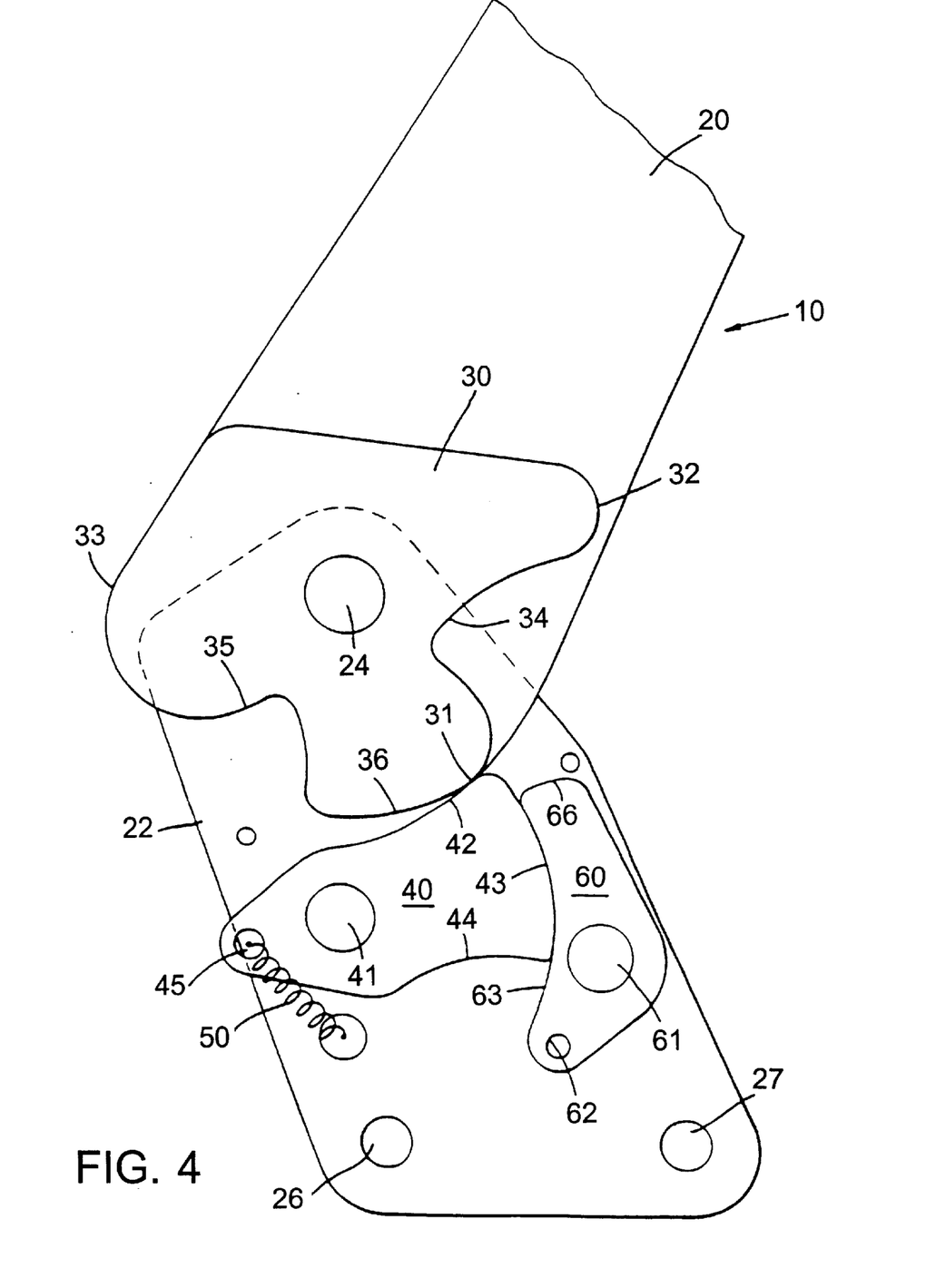
FIG. 4 shows a schematic side view of the locking mechanism of FIG. 1A, in a condition corresponding to seat back unlocked and partially folded.
Figure 6:
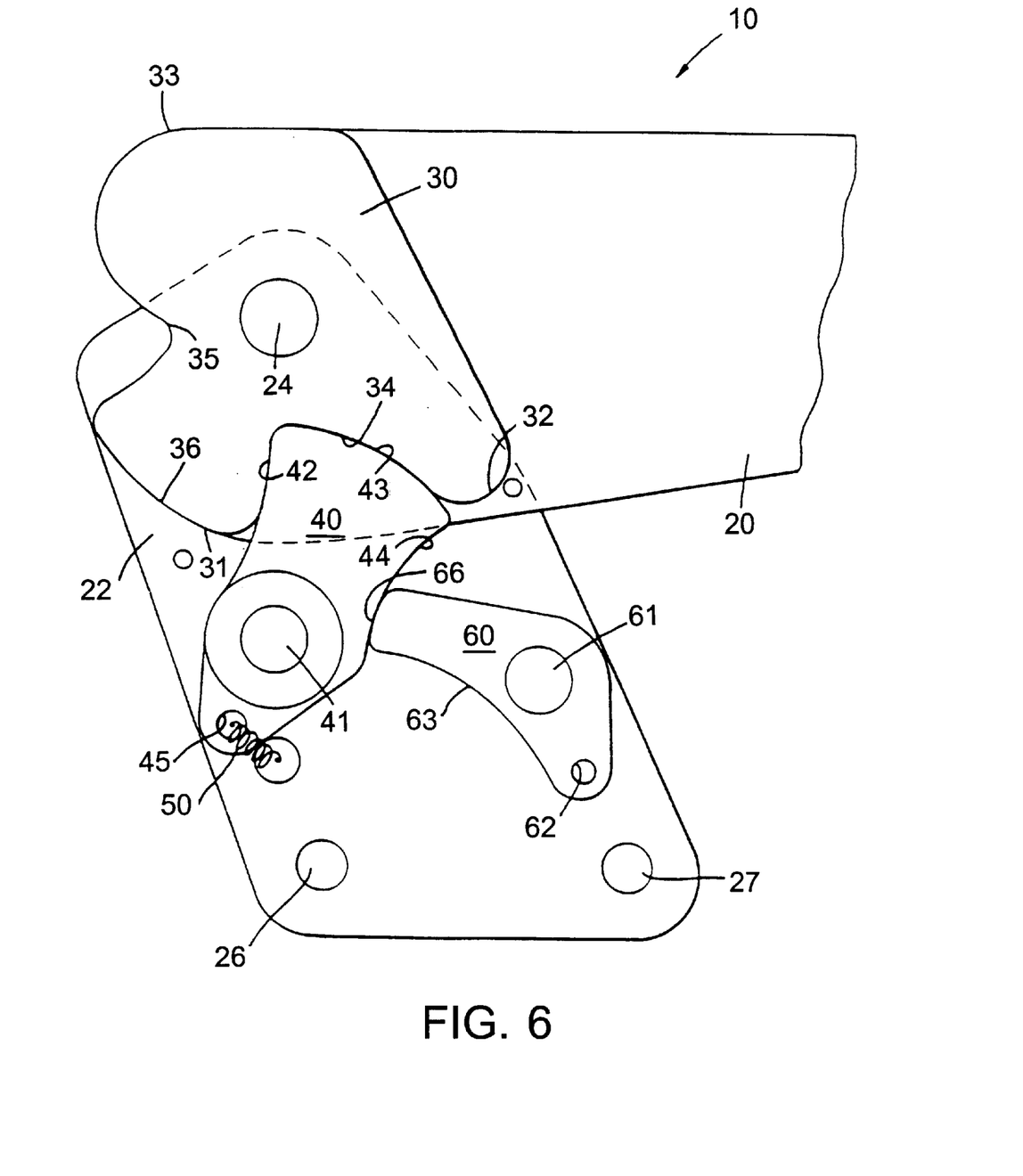
FIG. 6 shows a schematic side view of the locking mechanism of FIG. 1A, in a condition corresponding to seat back fully folded and locked and with staple latch disengaged.

The seat back 20 is now free to rotate, the undetented cam surface 36 passing the delatch arm bearing surface 42 (as shown in FIG. 4—partially folded position) to the fully folded position (FIG. 5) where the spring bias causes the delatch arm 40 to drop into the deep detent position. The sensing cam 60 is now free from bearing surface 43 of the delatch arm 40, and is permitted to rotate anticlockwise to the release position as shown in FIG. 6, where the delatch arm is prevented from clockwise movement by the sensing cam. The movement of the sensing cam 60 is communicated to pawl 110 to drive pawl 110 to the position shown in FIG. 1C, or vice versa. Since the sensing cam 60 and the pawl 110 are mechanically coupled, the driving force to move the pawl 110 to the unlatched position of FIG. 1C, and the sensing cam 60 to the position of FIG. 6 can be provided at either end of the flexible control cable 64 (FIG. 1A), ie. by a seat release lever (not shown) coupled to sensing cam 60, or coupled to the link arm 113.

The presently preferred arrangement of an anchorage engaging mechanism and its coupling with the sensing cam 60 will now be described with reference to FIGS. 7 and 8.

Figure 7A:
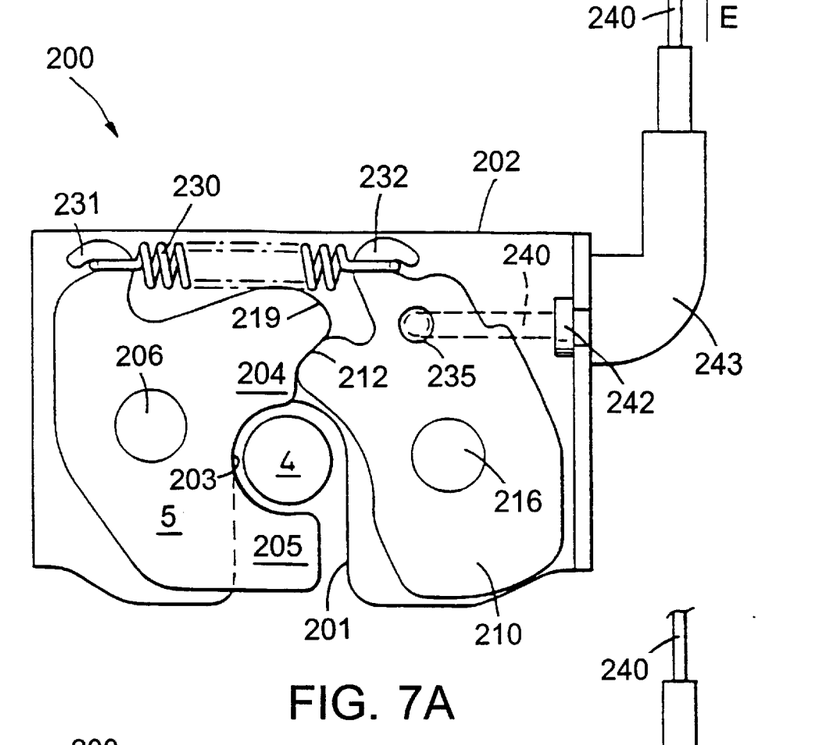
FIGS. 7A, 7B and 7C show detailed schematic views of a presently preferred staple and latch mechanism for use with the present invention, with FIG. 7A corresponding to a staple latch in engaged and locked condition.
Figure 7B:
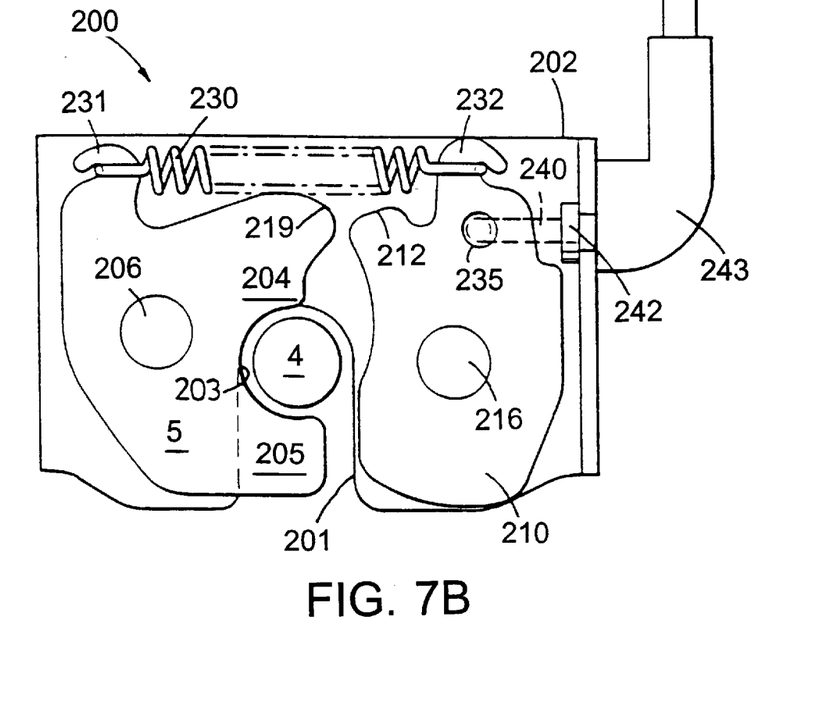
Figure 7C:
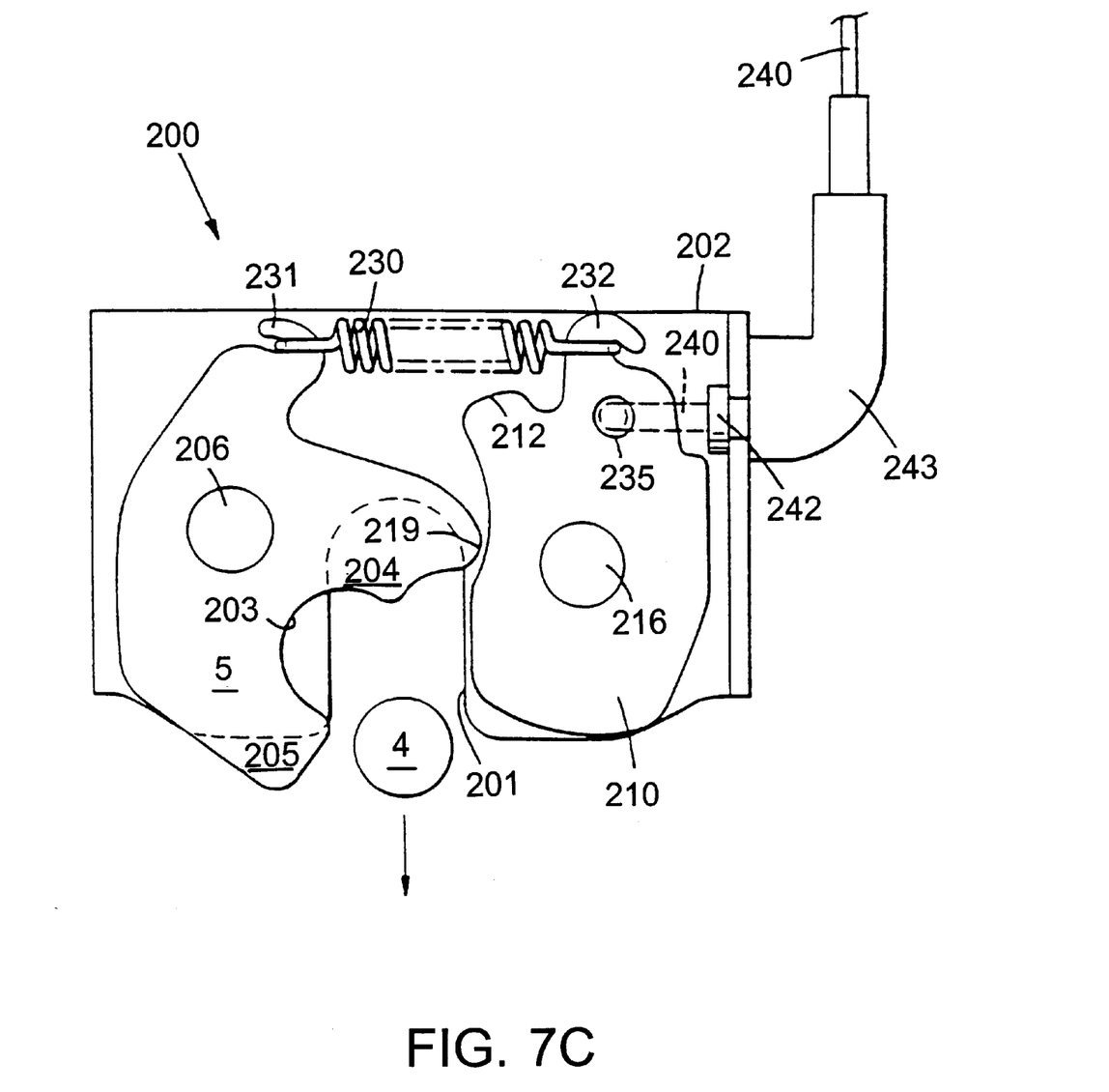

With reference to FIG. 7A, a floor latch 200 comprises a frame 202 having a slot 201 in which the floor staple 4 is received. A latch member 5 is pivotally mounted on the frame 202 about pivot 206 and has a recess 203 which is defined between a heel 204 and a toe 205. The latch member 5 is spring biassed, in a clockwise direction, by a spring 230 having a first end extending from a hook 231 on the latch member 5. A pawl 210 is also pivotally mounted on the frame 200 about a pivot 216, and is biassed, in an anticlockwise direction, by the spring 230 whose second end extends from a hook 232 on the pawl 210. The pawl 210 includes a bearing surface 212 adapted to engage with an upper extent of the heel 204.

In the condition shown in FIG. 7A, the staple 4 is engaged in the slot 201, and is locked in position by the latch member 5 which is, in turn, locked in position by the pawl 210.

Coupled to the pawl 210 at an eye 235 is an interlock control cable 240, shown in dotted outline, extending from a collar 242 and sleeve 243. The other end of the control cable 240 is connected to the connecting aperture 62 of the sensing cam 60. The sensing cam is also connected to a suitable lever or knob (not shown) which serves to actuate the sensing cam 60, and thereby the control cable 240. To release the staple 4 from the slot 201, the control cable is pulled through the sleeve 243 in the direction as indicated by arrow E, which rotates pawl 210 against the spring 230 bias, and moves the bearing surface 212 clear of the heel 204 reaching the position shown in FIG. 7B. The latch member 5 is then free to rotate as the staple is pulled out of slot 201 to the condition shown in FIG. 7C. A bearing surface 219 on the heel 204 then prevents pawl 210 from returning in an anticlockwise direction, to its home position of FIG. 7A.

The action of spring 230 ensures that the latch member 5 remains in the clockwise-most, disengaged position until overcome by the action of a staple 4 being forced completely into slot 201. At this point, the bearing surface 219 clears pawl 210, the spring 230 acts upon the freed pawl to rotate it anticlockwise. The roles are thereby reversed with the bearing surface 212 of pawl 210 preventing return of the latch member in a clockwise direction to its open position of FIG. 7C. In other words, the floor latch 200 is essentially a bistable device which can be biassed to either of the latched or unlatched positions.

Figure 8A:
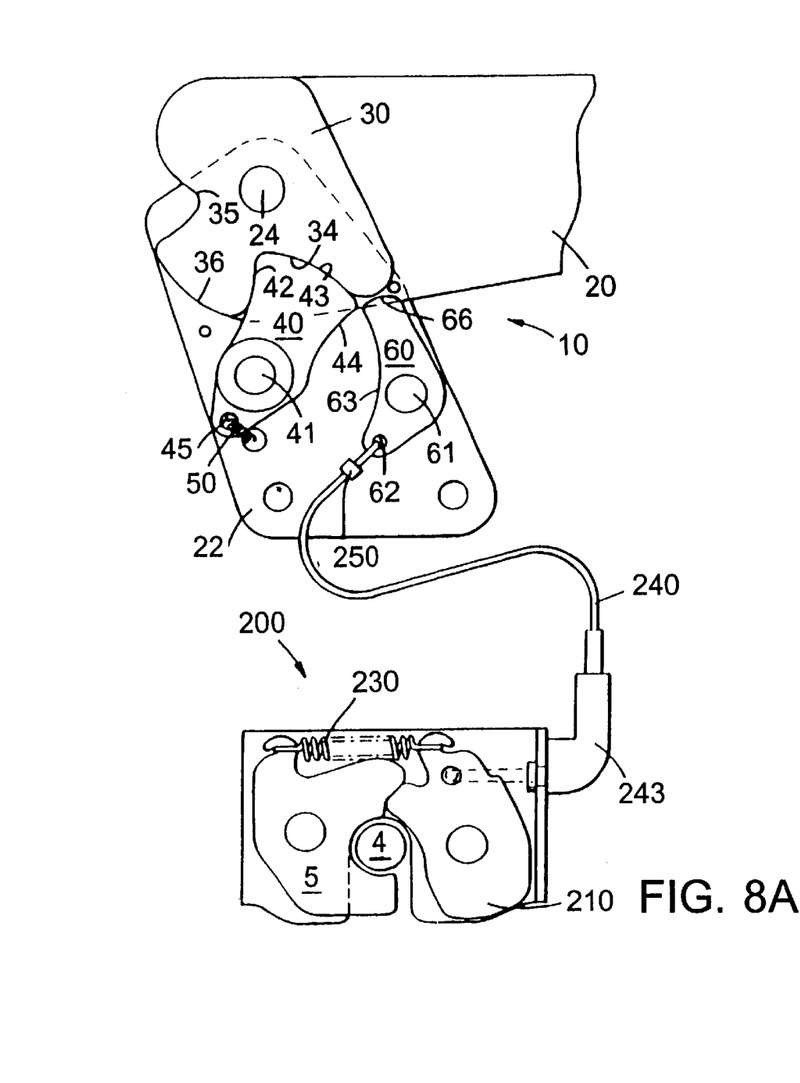
FIG. 8 shows a schematic view of the latch of FIGS. 7A–7C and the locking mechanism of FIGS. 2 to 6, together with an interlock cable connection therebetween, showing the staple engaged (FIG. 8A) and staple disengaged (FIG. 8B) conditions.
Figure 8B:
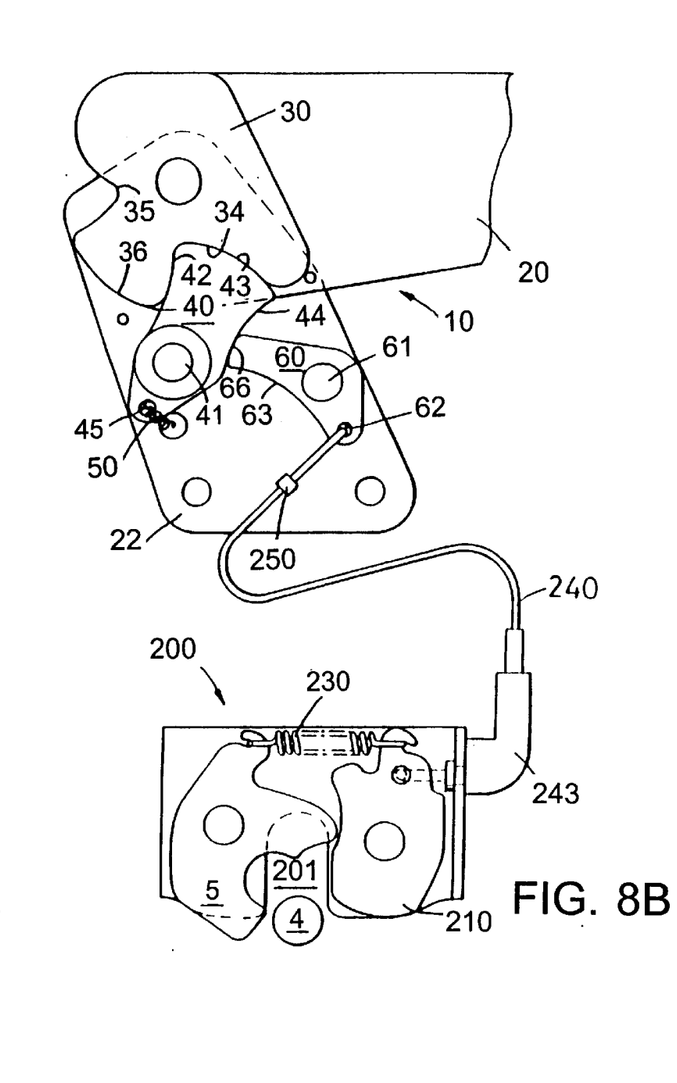

The control cable 240 is also coupled to the sensing cam 60 at connecting aperture 62 (FIGS. 5 and 6) by way of a suitable clip 250 on the support plate 22 (FIGS. 8A and 8B). Thus, the control cable 240 also acts as an interlock device between the floor latch 200 and the locking mechanism 10, notwithstanding their remoteness from one another, as will become clear from FIGS. 8A and 8B.

FIG. 8A shows the floor latch 200 in the latched condition with the floor staple 4 retained by the latch member 5, and the sensing cam in corresponding condition as shown in FIGS. 2 to 5. The delatch arm 40 is thereby free to be rotated in manner previously described enabling the seat back to be raised and lowered.

FIG. 8B shows the floor latch 200 in the unlatched condition with the floor staple 4 removed from the slot 201. The delatch arm 40 is thereby constrained to be in the deep detent position of FIG. 6 preventing the seat back 20 from being raised.

In the configuration of FIG. 6, it will be noted that the seat back rest 20 is firmly locked into the folded position to enable easy lifting and/or stowage of the seat without the back rest moving in relation to the seat. In particular, the locking action of the bearing surface 42 on deep detent 34 prevents movement of the seat back 20 in an anticlockwise direction; the action of the bearing surface 43 on deep detent 34 prevents movement of the seat back 20 in a clockwise direction. (Alternatively, clockwise movement of the seat back 20 may be prevented simply by contact of the seat back 20 with the seat cushion 8 or a separate stop member.)

The seat back rest 20 cannot be moved from the position of FIGS. 6 and 8B until the sensing cam 60 is relocated to its fully clockwise position. In turn, this cannot be achieved until the latch member 5 is correctly engaged with floor staple 5. Thus, to deploy the seat, the user must first correctly engage the floor staple 5 into the floor latch 200: by the action of spring 230, the sensing cam 60 will automatically be pulled by the release cable to the position of FIG. 5. The seat back may then be folded by actuating delatch arm 40 in manner described above.

In stowing the seat, the seat back 20 is first folded to the position of FIG. 5 as previously described; the sensing cam is rotated anticlockwise by the user by means of a suitable lever or knob connected thereto (not shown). This motion rotates the pawl 210 against spring 230 bias by virtue of the control cable 240 linkage, and the latch is then freed to allow the staple to be disengaged from the slot 201.

It will be understood that the locking mechanism herein described may be configured in both left-hand and right-hand configurations, ie. to include a mechanism being the mirror image of the drawings presented.

The present invention has particular utility where the locking mechanism 10 is remote from the latching point, and in particular, the use of a flexible control cable allows the relative positions of the locking mechanism 10 and the floor latching point to vary. This is a preferred feature in the case of a seat with a laterally folding leg, such as that described in PCT application GB95/02824, referenced above, in particular with reference to FIGS. 3, 4 and 5 and the associated description.

In other embodiments, linking rods, or electromechanical devices may be used to actuate the sensing cam and delatch arm and/or floor latch. The embodiments described above also enable several locking mechanisms 10 to be used on a seating unit, for example at each end of a bench type seat, or several interlinked latching mechanisms to be used at different points on the seat.

We claim:

1. A seat locking mechanism for a seat having a foldable seat back and a delatchable anchorage engagement mechanism for latching the seat to an anchorage point, the seat locking mechanism comprising:

a seat back cam rigidly affixed to the seat back and having a cam surface incorporating a deep detent and a shallow detent;

the seat back cam being lockable in a first position, corresponding to a folded position of the seat back, by a delatch arm when the delatch arm is engaged in the deep detent and lockable in a second position, corresponding to an upright position of the seat back, when the delatch arm is engaged in the shallow detent, the delatch arm being movable out of engagement with the cam surface to allow the seat back to be moved between the folded position and the upright position;

a sensing member for coupling to an anchorage engaging mechanism, the sensing member having a first position representative of when the anchorage point is disengaged and a second position representative of when the anchorage point is engaged;

the delatch arm preventing movement of the sensing member between its first and second positions except when the delatch arm is engaged in the deep detent.

2. A seat locking mechanism according to claim 1 wherein the sensing member includes a bearing surface which engages with the delatch arm to prevent movement thereof when the sensing member is in its first position.

3. A seat locking mechanism according to claim 1 wherein the delatch arm includes means to bias the delatch arm towards the cam surface.

4. A seat locking mechanism according to claim 1, claim 2 or claim 3 wherein the delatch arm includes a knob or lever directly connected thereto for actuating the delatch arm.

5. A seat locking mechanism according to claim 1, claim 2 or claim 3 wherein the delatch arm is actuable by a remote control coupled to the delatch arm via a mechanical or electromechanical linkage.

6. A seat locking mechanism according to claim 1 wherein the sensing member is coupled to an anchorage engaging mechanism by a mechanical or electromechanical linkage.

7. A seat locking mechanism according to claim 6 wherein the sensing member is coupled to the anchorage engaging mechanism by a flexible control cable.

8. A seat locking mechanism according to claim 6 or claim 7 wherein the sensing member includes means to bias the sensing member toward its first position, being moveable to its second position by action of the anchorage engaging mechanism engaging with the anchorage.

9. A seat locking mechanism according to claim 6 or claim 7 wherein the sensing member is alternately biassed into both its first and second positions by an anchorage engaging mechanism which is bistable in either of a latched or unlatched condition.

10. A seat locking mechanism according to claim 9 wherein the anchorage engaging mechanism is adapted to be driven from the latched to the unlatched condition by operating the sensing member between its second and first positions and subsequently withdrawing the anchorage engaging mechanism from the anchorage point.

11. A seat locking mechanism according to claim 10 wherein the sensing member is actuable by a knob or lever directly connected thereto.

12. A seat locking mechanism according to claim 9 wherein the sensing member is adapted to be driven from its first to its second position by the action of engaging the anchorage engaging mechanism with the anchorage point.

13. A seat locking mechanism according to claim 1, 2, 3, 6, or 7 wherein the seat back cam is adapted to rotate about a pivot between its first and second positions, and wherein the delatch arm is adapted to provide full locking of the seat back cam against both clockwise and counterclockwise movement when the delatch arm is engaged in the deep detent.

14. A seat locking mechanism according to claim 1, 2, 3, 6, or 7 wherein the seat back cam is adapted to rotate about a pivot between its first and second positions, and wherein the delatch arm is adapted to provide full locking of the seat back cam against both clockwise and counterclockwise movement when the delatch arm is engaged in the shallow detent.

15. A seat incorporating a seat locking mechanism according to claim 1, 2, 3, 6, or 7.

* * * * *

UNITED STATES PATENT AND TRADEMARK OFFICE
CERTIFICATE OF CORRECTION

PATENT NO.   : 5,938,286
DATED        : August 17, 1999
INVENTOR(S)  : Neil H. L. Jones et al.

It is certified that error appears in the above-identified patent and that said Letters Patent is hereby corrected as shown below:

On the cover of the patent in the "[73] Assignees" section, "Grouup" should be --Group--.

Col. 3, line 17, replace "anticlockwise" with -- counterclockwise--.

Signed and Sealed this

Twenty-fourth Day of October, 2000

Attest:

Q. TODD DICKINSON

*Attesting Officer*                *Director of Patents and Trademarks*